Feb. 23, 1937.  C. E. FREDERICKSON  2,071,686
MOTOR VEHICLE
Filed Oct. 3, 1934  2 Sheets-Sheet 1

Inventor
Clayton E. Frederickson
By Albert E. Dieterich
Attorney

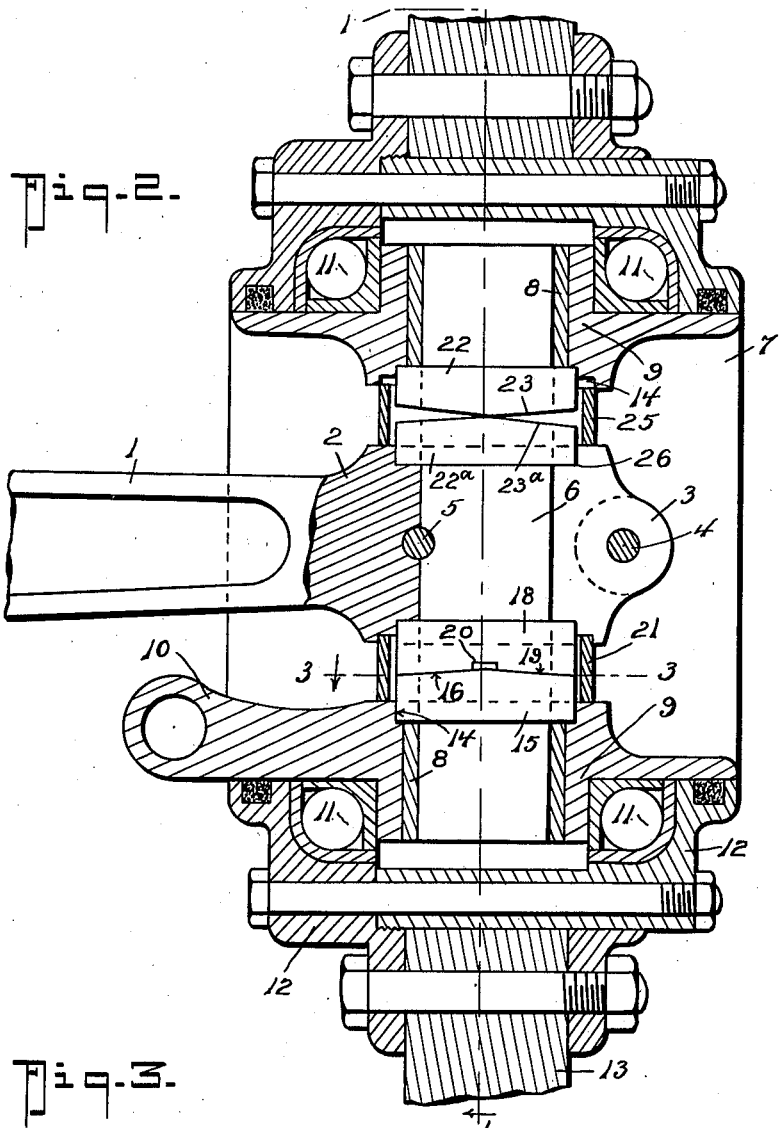

Patented Feb. 23, 1937

2,071,686

UNITED STATES PATENT OFFICE 2,071,686

MOTOR VEHICLE

Clayton E. Frederickson, Chicago, Ill.

Application October 3, 1934, Serial No. 746,731

11 Claims. (Cl. 280—96.3)

My present invention relates to the art of motor vehicles and especially to land vehicles, such as are commonly called automobiles, and it primarily has for its object to provide a steering mechanism for such vehicles which is especially adapted to the use of air wheels, i. e., wheels having balloon tires of very low inflation pressures, say of about ten pounds. When using wheels having tires of such low pressures it is impracticable to employ steering mechanisms possessing camber, caster and toe-in such as are now commonly used in automobiles employing the medium pressure (thirty to thirty-five pounds) tires, or the high pressure tires (of sixty to sixty-five pounds pressure) heretofore commonly employed. Therefore, it is an object of the invention to provide a mechanism in which, without the use of camber, caster or toe-in means, the wheels will, when freed of steering wheel manipulation, always tend to straighten out and guide the vehicle in a forward direction. I accomplish this by a structure which is a modification of the structure shown and described in my Letters Patent No. 1,599,614, issued September 14, 1926.

Further, it is an object to adapt the mechanism of my said Letters Patent No. 1,599,614 to accomplish my present purpose by simple means which will retain many of the functional and structural advantages, and manufacturing economies, that are present in the said patented structure.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, and then be particularly pointed out in the appended claims, reference being had to the drawings in which:—

Figure 2 is an enlarged vertical section on the line 2—2 of Figure 1.

Figure 3 is a horizontal section on the line 3—3 of Figure 2.

Figure 1:
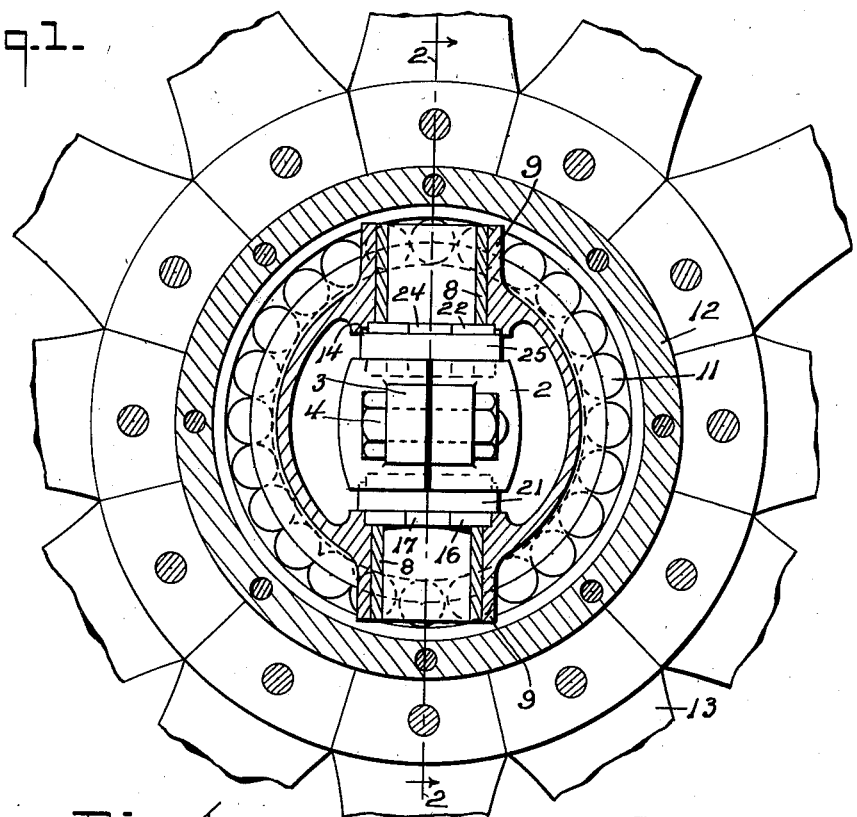
Figure 1 is a detail vertical section and part elevation of a portion of a steering mechanism embodying the invention, the section being taken on substantially line 1—1 of Figure 2.
Figure 4:
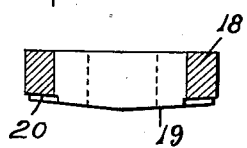
Figure 4 is a section on the line 4—4 of Figure 5.
Figure 5:
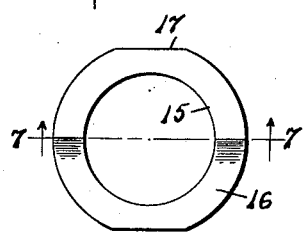
Figure 5 is an inverted plan view of the upper bearing block of the lower pair.
Figure 6:
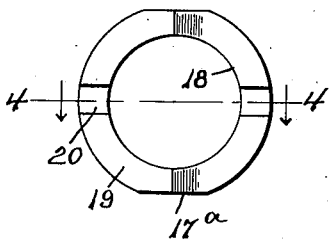
Figure 6 is a plan of the lower bearing block of the lower pair.
Figure 7:
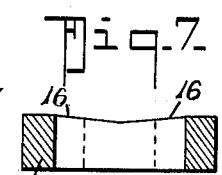
Figure 7 is a cross section on the line 7—7 of Figure 6.
Figure 8:
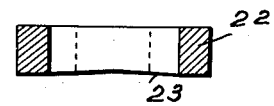
Figure 8 is a cross section on the line 8—8 of Figure 9.
Figure 9:
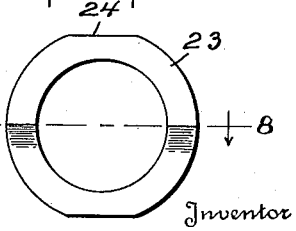
Figure 9 is a plan view showing the contacting face of one of the pair of upper bearing blocks.

In the drawings in which like numerals of reference indicate like parts in all of the figures, 1 represents the axle which has a pin-carrying end 2 (preferably split) formed with ears 3 to receive a bolt and nut device 4 by means of which the split end 2 may be tightened rigidly to hold the pivot pin 6. In lieu of the split clamp, or in addition thereto if preferred, other means may be employed for holding the pivot pin rigidly in place on the end of the axle, such a means, for example, as a key pin 5. It is understood that any suitable means for holding the pivot pin 6 in place on the end 2 of the axle 1 may be employed.

A cylindrical body 7 (constituting a steering hub) is provided with bearing bosses 9 suitably bushed as at 8 to receive the upper and lower ends of the pivot pin 6, the body 7 having an arm 10 for connection to the usual steering rod that connects in the usual manner with the hand wheel by which the vehicle is steered. The steering rod and hand wheel mechanism are not shown as this mechanism per se constitutes no part of the present invention.

11 designates the anti-friction bearings and 12 indicates the wheel hub structure which is mounted on said bearings and the cylindrical body 7, while 13 indicates the spokes of the wheel. The wheel hub and bearing structure may be the same as that disclosed in my Letters Patent aforesaid.

The bearing bosses 9 are recessed as at 14 to receive the upper and lower bearing blocks 22 and 15 respectively and the pin carrying end 2 of the axle 1 is likewise recessed as at 26 to receive the intermediate bearing blocks 22a and 18 respectively.

Located between the lower boss 9 and the under side of the pin carrying end 2 of the axle 1 is a pair of bearing blocks 15 and 18 which have beveled faces 16 and 19 respectively opposing one another as male and female, the upper block having a groove or recess 20 to allow for wear.

Surrounding the blocks 15 and 18 is a dust ring 21, the purpose of which is to keep out dirt and dust from the bearing surfaces of the blocks 15 and 18. Interposed between the pin carrying end of the axle 1 and the upper boss 9 is a second pair of bearing blocks 22a—22. These blocks are of the same construction and have beveled faces 23—23a. The upper blocks, however, are not set to operate as male and female, but have their high points normally in contact when the wheel is in the straight-forward position (see Figure 2). It should be understood that the beveled faces 16—19 and 23—23a are so pitched as to maintain an anti-rattle connection between the members 2 and 9. That is to say, as the wheel is turned out of a straight-forward position to one side or the other, the inclined surfaces 16—19 will lift the axle 1, while the inclined surfaces 23—23a will permit a corresponding decrease to take place between the axle 1 and the upper boss 9, and vice versa.

The recesses 14 and 26 have flattened portions to fit the flattened portions 17 and 17a of the bearing members 16 and 18 and the flattened faces 24 of the bearing members 22—22a so that when the parts are assembled the bearing members 18 and 22a will remain as a unit with the shaft 1, while the bearing members 15 and 22 will turn as a unit with the cylindrical body 7 on the pivot pin 6 as an axis.

By reason of the weight of the vehicle being transmitted through the axle 1 and the male and female inclined faces 16 and 19 there will be a continuous tendency for the wheel to straighten out and remain with its axis of rotation in alignment with the axis of the axle 1, or in other words maintain the vertical central longitudinal plane of the wheel normal to the axle. In this way I am able to do away with camber, caster and toe-in, and yet obtain the same effect in steering as is had in wheels using ordinary balloon or high pressure tires with camber, caster, etc.

The bearing blocks are made of hard steel with their surfaces ground to fit. Of course the angles of the beveled surfaces must be such as not to render steering difficult, and this angle will be determined according to the weight and type of machine on which the invention is to be used.

From the foregoing description, taken in connection with the accompanying drawings, it is thought that the construction, operation and advantages of the invention will be clear to those skilled in the art to which it appertains.

What I claim is:

1. In motor vehicles, an axle, a vertically disposed pivot pin carried by the axle without caster effect, means securing the pin to the axle to extend above and below the same, a steering hub having bearings journalled on said pin, a wheel rotatably mounted on said hub and means mounted on said pin and hub for continuously tending to maintain the axis of the hub in alignment with the axle.

2. In motor vehicles, an axle, a vertically disposed pivot pin carried by the axle without caster effect, means securing the pin to the axle to extend above and below the same, a steering hub having bearings journalled on said pin, a wheel rotatably mounted on said hub, and means interposed between said hub and said axle for continuously tending to maintain the axis of the hub in alignment with the axle.

3. In motor vehicles, an axle, a vertically disposed pivot pin carried by the axle without caster effect, means securing the pin to the axle to extend above and below the same, a steering hub having bearings journalled on said pin, a wheel rotatably mounted on said hub and means on said pin and located between said axle and said hub for continuously tending to maintain the wheel in a plane normal to the axle.

4. In motor vehicles, an axle, a vertically disposed pivot pin carried by the axle without caster effect, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle.

5. In motor vehicles, an axle, a vertically disposed pivot pin carried by the axle without caster effect, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle, and a dust ring encircling said blocks.

6. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axis, and an upper pair of bearing blocks located between said axle and said hub, and means causing one block of said upper pair to turn with the hub as a unit and the other block of the upper pair to be held stationary with the axle as a unit, said upper pair of blocks having oppositely beveled faces.

7. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle, a dust ring encircling said blocks, and an upper pair of bearing blocks located between said axle and said hub, means causing one block of said upper pair to turn with the hub as a unit and the other block of the upper pair to be held stationary with the axle as a unit, said upper pair of blocks having oppositely beveled faces.

8. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle, an upper pair of bearing blocks located between said axle and said hub, means causing one block of said upper pair to turn with the hub as a unit and the other block of the upper pair to be held stationary with the axle as a unit, said upper pair of blocks having oppositely beveled faces, and a dust ring encircling said upper pair of blocks.

9. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle, a dust ring encircling said blocks, an upper pair of bearing blocks located between said axle and said hub, means causing one block of said upper pair to turn with the hub as a unit and the other block of the upper pair to be held stationary with the axle as a unit, said upper pair of blocks having oppositely beveled faces, and a dust ring encircling said upper pair of blocks.

10. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle, an upper pair of bearing blocks located between said axle and said hub, and means causing one block of said upper pair to turn with the hub as a unit and the other block of the upper pair to be held stationary with the axle as a unit, said upper pair of blocks having oppositely beveled faces, the said pairs of blocks cooperating with one another whereby as said hub is turned on said pin as a pivot the space will be increased between the hub and the axle beneath the axle and correspondingly decreased between the hub and the axle above the axle and vice versa.

11. In motor vehicles, an axle, a pivot pin carried by the axle, means securing the pin to the axle to extend above and below the same, a steering hub having bearings journalled on said pin, a wheel rotatably mounted on said hub, a lower pair of bearing blocks located between said axle and said hub, means causing one block to turn with the hub as a unit and to cause the other block to be held stationary with the axle as a unit, said blocks having interfitting beveled abutting faces constructed to continuously tend to maintain the wheel in a plane normal to the axle an upper pair of bearing blocks located between said axle and said hub, and means causing one block of said upper pair to turn with the hub as a unit and the other block of the upper pair to be held stationary with the axle as a unit, said upper pair of blocks having oppositely beveled faces, the said pairs of blocks cooperating with one another whereby as said hub is turned on said pin as a pivot the space will be increased between the hub and the axle beneath the axle and correspondingly decreased between the hub and the axle above the axle and vice versa, the lower pair of blocks having their interfitting beveled faces positioned to maintain the wheel in a straightforward position when free.

CLAYTON E. FREDERICKSON.